(12) United States Patent
Ozaki et al.

(10) Patent No.: US 7,971,706 B2
(45) Date of Patent: Jul. 5, 2011

(54) CONVEYOR CHAIN AND CONVEYOR CHAIN DRIVING DEVICE

(75) Inventors: Hajime Ozaki, Osaka (JP); Katsutoshi Shibayama, Osaka (JP); Satoshi Hotchi, Tokyo (JP); Tsuyoshi Nakamura, Tokyo (JP); Fukukazu Kato, Tokyo (JP)

(73) Assignee: Tsubakimoto Chain Co., Osaka (JP)

(*) Notice: Subject to any disclaimer, the term of this patent is extended or adjusted under 35 U.S.C. 154(b) by 98 days.

(21) Appl. No.: 12/391,456

(22) Filed: Feb. 24, 2009

(65) Prior Publication Data

US 2009/0266683 A1    Oct. 29, 2009

(30) Foreign Application Priority Data

Apr. 28, 2008  (JP) .................. 2008-117321

(51) Int. Cl.
B65G 23/04    (2006.01)

(52) U.S. Cl. ...................... 198/835; 198/853

(58) Field of Classification Search .......... 198/835, 198/853
See application file for complete search history.

(56) References Cited

U.S. PATENT DOCUMENTS

| | | | |
|---|---|---|---|
| 595,508 A | | 12/1897 | Wolander |
| 2,223,639 A | * | 12/1940 | Ponder ............. 198/832 |
| 3,002,604 A | * | 10/1961 | Brems ............. 198/832 |
| 3,493,097 A | * | 2/1970 | Karr ............. 198/811 |
| 4,249,838 A | * | 2/1981 | Harvey et al. ........ 406/51 |
| 4,476,974 A | * | 10/1984 | Bradbury ........... 198/832 |
| 4,650,066 A | * | 3/1987 | Bradbury ........... 198/832 |
| 4,832,183 A | | 5/1989 | Lapeyre |
| 5,020,656 A | * | 6/1991 | Faulkner ........... 198/494 |
| 5,076,422 A | * | 12/1991 | Clopton ........... 198/838 |
| 5,083,659 A | | 1/1992 | Bode |
| 5,176,240 A | * | 1/1993 | Harris ............ 198/343.1 |
| 5,217,110 A | | 6/1993 | Spangler |
| 5,339,946 A | * | 8/1994 | Faulkner et al. ....... 198/494 |
| 5,797,820 A | | 8/1998 | Endo |
| 5,911,305 A | | 6/1999 | Layne |
| 6,119,848 A | * | 9/2000 | Hartness et al. ....... 198/833 |
| 7,222,682 B2 | * | 5/2007 | Doering et al. ....... 175/106 |
| 2005/0263325 A1 | | 12/2005 | Doering |

FOREIGN PATENT DOCUMENTS

| | | |
|---|---|---|
| EP | 0459691 | 12/1991 |
| JP | 50-128882 | 10/1975 |
| JP | 05116654 | 5/1993 |
| JP | 5-72825 | 10/1993 |
| JP | 06-211329 | 8/1994 |
| JP | 2004-123336 | 4/2004 |
| JP | 2004189416 | 7/2004 |

OTHER PUBLICATIONS

European Search Report dated Aug. 3, 2009.

* cited by examiner

*Primary Examiner* — Joe Dillon, Jr.
(74) *Attorney, Agent, or Firm* — Dann, Dorfman, Herrell and Skillman, P.C.; Henry H. Skillman

(57) ABSTRACT

A conveyor having conveyor chain 100 adapted to be engaged and driven by drums 180 and 190 having spiral flights. The conveyor chain has a number of interconnected conveying modules 120, 140, 150 and 160. Selected modules 120 are aligned in the direction of travel parallel to the axis of rotation of the drums. Each of the aligned modules has a traveling guide socket 122 on the back surface, which engages with flight portions 180a and 190a of the spiral drums, so that the chain is advanced by the rotation of the drums. The modules are rectangular and are interconnected in columns and rows, preferably in a brick pattern.

3 Claims, 8 Drawing Sheets

CONVEYOR CHAIN AND CONVEYOR CHAIN DRIVING DEVICE

FIELD OF INVENTION

The present invention relates to a conveyor chain and a conveyor chain driving device, which are used in conveyance and sorting of articles and movement of a worker and the like in a factory, and more specifically relates to a conveyor chain driven by spiral drums and a conveyor chain driving device using the same.

BACKGROUND OF THE INVENTION

A conveyor chain conveying device in which traveling guide protrusions are vertically provided on the underside of links of a conveyor chain at predetermined intervals, so as to engage in spiral grooves provided spiral drums has been known (see for example, Japanese Laid-Open Utility Model Publication No. Sho. 50-128882). In this known conveyor, the intervals between the traveling guide protrusions correspond to the pitch of the spiral grooves of the spiral drums, so that the conveyor chain is driven by the rotation of the spiral drums. This known conveyor is called a spiral drum conveyor chain driving device

PROBLEMS TO BE SOLVED BY THE INVENTION

However, since in the conventional spiral drum driving type conveyor chain driving device, the traveling guide protrusion has a shape in which it is protruded from a link of the conveyor chain, there was a problem that when the spiral drum is rotated so that the traveling guide protrusion is sequentially advanced along the spiral grooves, the traveling protrusion gets on a flight portion of the spiral drum (spiral mountain) so that it is likely that a force is liable to be generated, which acts to dislodge the conveyor chain from the spiral drum.

Further, since in the conventional spiral drum driving type conveyor chain driving device, the chain is formed by slats extending across the full width of the transfer passage, there were problems that it is not easy to change the width of the conveyor chain driving device and additionally the driving force is increased or decreased in accordance with a load.

SUMMARY OF THE INVENTION

Accordingly, the technical problems to be solved by the invention, that is the object of the present invention is to provide a conveyor chain and a conveyor chain driving device using a conveyor chain which is difficult to be dislodged from a spiral drum and which can be flexibly adapted to a change in a width direction and increase/decrease in a load in a spiral drum driving type conveyor chain and a conveyor chain driving device using the conveyor chain.

The invention solves the above-mentioned problems by providing a conveyor chain in which a number of interconnected driving modules are driven by spiral drums so that articles to be conveyed placed on conveying surfaces of the conveying modules are conveyed along a predetermined transfer passage, characterized in that a traveling guide socket, which engages with a flight portion of the spiral drum, is provided on the back surface of the conveying module. The term "articles to be conveyed" includes all things which can be conveyed, not only objects such as products and articles, but also workers and the like.

The invention further solves the above-mentioned problems by providing an open traveling guide socket which is generally rectangular, whose short sides are parallel to the travel direction of the chain and has opposite long sides of the socket in the form of two segments which incline inwardly to central points which are symmetrical with respect to the center of the socket.

Further, the invention solves the above-mentioned problems by providing a plurality of ribs in parallel with the travel direction of the chain conveyor chain.

Additionally, the invention solves the above-mentioned problems providing a traveling guide socket, which engages with a flight portion of the spiral drum, on the back surface of selected conveying modules. The vertical cross-sectional shape of the traveling guide socket along the travel direction of the chain may be a reversely tapered, i.e. widened from the concave open side toward the socket's bottom surface, so as to cc-operate with a flight portion of the spiral drum whose cross-sectional shape is inclined to the travel direction of the chain.

Accordingly, since the interconnected conveying modules are driven by spiral drums so that articles to be conveyed placed on conveying surfaces of the conveying modules are conveyed along a transfer passage in a travel path parallel to the rotary axes of the spiral drums, the traveling guide socket, which engages with a flight portion of the spiral drum, receives the driving force from the spiral drum along the travel direction in the vicinity of a pitch line of the conveyor chain. Thus it is difficult for any force which tends to move the conveyor chain toward one or the other side of the chain to function. As a result the transmission loss of the driving force is reduced and smooth chain travel can be realized.

Further, since a number of connected small conveying modules form the conveyor chain, the number of molds for manufacturing the conveying modules can be decreased so that the reduction in parts manufacturing costs can be realized.

The width of the conveyor chain can be changed by changing of the number of interconnected conveying modules. Similarly, the number of spiral drums can be changed in accordance with the width of the conveyor chain. Therefore, a flexibility improvement of use of the conveyor chain and the conveyor chain driving device can be realized.

Preferably, the traveling guide socket is rectangular with central points in the opposed long sides of the socket and is symmetrical about the center of the socket, so that the conveyor chain can be assembled irrespective of the direction of the conveying module. Thus the reduction in the number of parts and the reduction in a load of the assembly work of the conveyor chain can be realized.

The traveling guide sockets can be engaged with both right and left winding spiral drums without being influenced by the directions (either right-hand or left-hand) of the spiral of a spiral drum, providing a flexibility improvement of use of the conveyor chain.

A plurality of ribs in parallel with the travel direction of the chain are provided in the socket, to enhance the strength of the thin walled traveling guide socket, improving the load resistant performance and tensile strength of the conveyor chain.

In the conveyor assembly according to the invention, any forces tending to displace the conveyor chain transversely to the direction of travel are counterbalanced, and the engagement between the fights of the spiral drums and the long sides of the socket resists dislodgement of the chain from the drum, the conveyor chain can realize smooth chain travel without rise-up where it passes over a spiral drum.

The conveyor chain is difficult to be dislodged from spiral drums and can be flexibly adapted to a change of its width direction and an increase and an decrease in a load by changing the number of interconnected conveying modules. The articles to be conveyed on conveying surfaces of the conveying modules are conveyed along a predetermined transfer passage, and the traveling guide sockets engage with the flight portions of the spiral drums to resist dislodgement.

The conveyor chain is difficult to be dislodged from spiral drums and can be flexibly adapted to a change of its width direction and an increase and a decrease in a load is accommodated by changing the number of interconnected conveying modules in the conveyor chain and the number of spiral drums which drive the conveyor chain. The vertical cross-sectional shape of the traveling guide socket along the travel direction of the chain is a reversely tapered shape widened from the concave open side toward the concave bottom surface side and an axial cross-sectional shape of the flight portion of the spiral drum is a shape inclined to the travel direction of the chain, so that dislodgement of the chain is resisted.

DESCRIPTION OF THE PREFERRED EMBODIMENTS

The First Embodiment

The first embodiment of a conveyor chain and a conveyor chain driving device according to the present invention will be described with reference to FIGS. 1 to 5.

Figure 1:
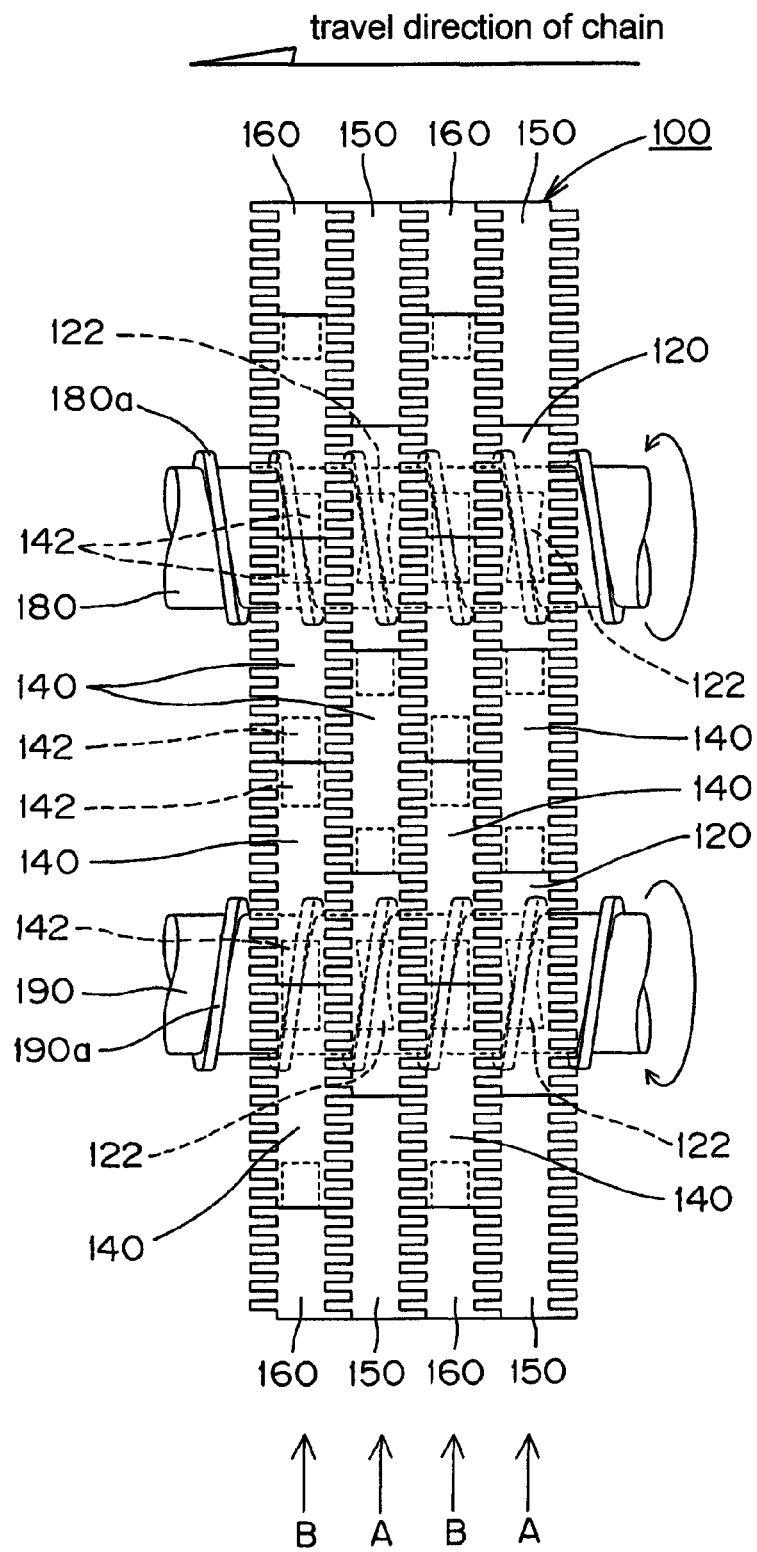
FIG. 1 is a top plan view, showing the article conveying surface side of a conveyor chain and a conveyor chain driving device according to a first embodiment of the invention.

In the conveyor chain 100 of the present embodiment, four kinds of conveying modules composed of a spiral drum engagement module 120, a center module 140, a full size end module 150 of the same length as the center module 140, which is provided on both ends of the conveyor chain 100 every alternate row A of the module rows, and in the intermediate rows B a half size end module 160 of half length of the full size end module 150. All of the modules are rectangular in outline, with the long sides disposed transversely to the direction of travel in the transverse direction and the short sides disposed longitudinally of the direction of travel. The modules are interconnected laterally in rows transverse to the travel direction. The transverse rows extend across the full width of the carrying surface, and the modules in adjoining rows are offset to provide a brick pattern on the carrying surface, as shown in FIG. 1. It is noted that to clearly show the boundaries of the respective conveying modules the description of ribs formed on the back side of each conveying module in parallel with the travel direction of the chain is omitted and only traveling guide sockets 122 and non-ribbed portions 142, which are described later, are shown by dotted lines in FIG. 1.

The phrase "conveying modules . . . offset in a brick pattern" in the present invention means a pattern of conveying modules so that the ends of a conveying module in each transverse row is not aligned with the ends of a conveying module on the adjacent row. It is noted that in the present embodiment, the pattern of the conveying modules is such that the center of a conveying module on the adjacent row is positioned at a position of a boundary of a conveying module on the adjacent rows, as shown in FIG. 1. This pattern is preferable since it can reduce the kinds of conveying modules, which are needed.

Figure 2:
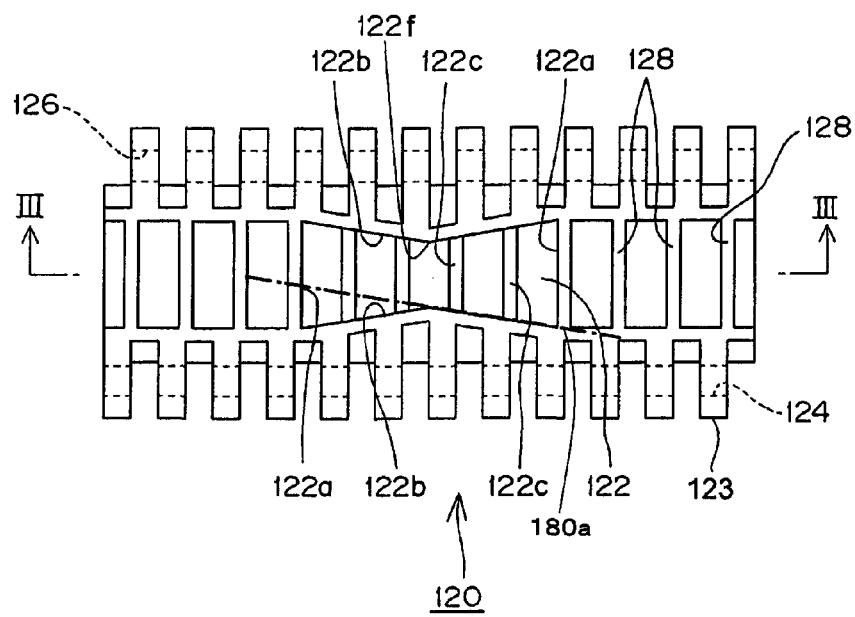
FIG. 2 is an inverted plan view of a spiral drum engagement module of the first embodiment, viewed from the back surface side.

The outline of the spiral drum engagement module 120 is a rectangle. The back surface of the module 120 has a generally rectangular traveling guide socket 122 in the center of the back surface. In the socket 122, short sides 122a are oriented in parallel with the chain travel direction in an open surface as shown in FIG. 2. The long sides of the socket are comprised of two segments which incline inwardly and converge to center points 122f in the mid-region of the long sides of the rectangular socket 122 near the center of the rectangle. In this embodiment, the outer appearance of the traveling guide socket 122 has a tsuzumi (hand drum) shape formed by straight lines and having six corners including the points 122f. The replacement of these straight lines by a curved line along a spiral surface of a flight portion of a spiral drum is preferable to reduce the harshness of the contact between the flight portion of the spiral drum and the traveling guide socket 122.

Figure 3:
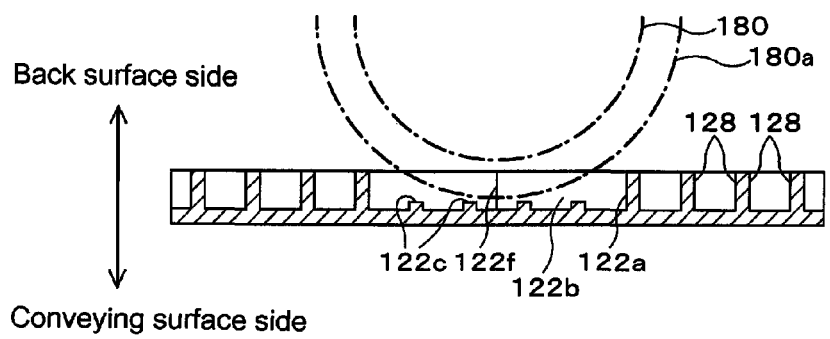
FIG. 3 is a cross-sectional view taken along the line III-III of FIG. 2, showing in broken lines a spiral drum for driving the chain.

Further, in the present embodiment a bottom of the traveling guide socket 122 is provided with a plurality of reinforcing ribs 122c in parallel with the chain travel direction. These ribs 122c are formed sufficiently lower than the height of other reinforcing ribs 128 as shown in FIG. 3 so that they reliably engage with the flight portion 180a of the spiral drum 180. It may be observed that the flight 180a of the drum 180 engages either the first or the second segment of the long wall 122b, depending on whether the flight is left-hand or right-hand spiral.

Figure 4:
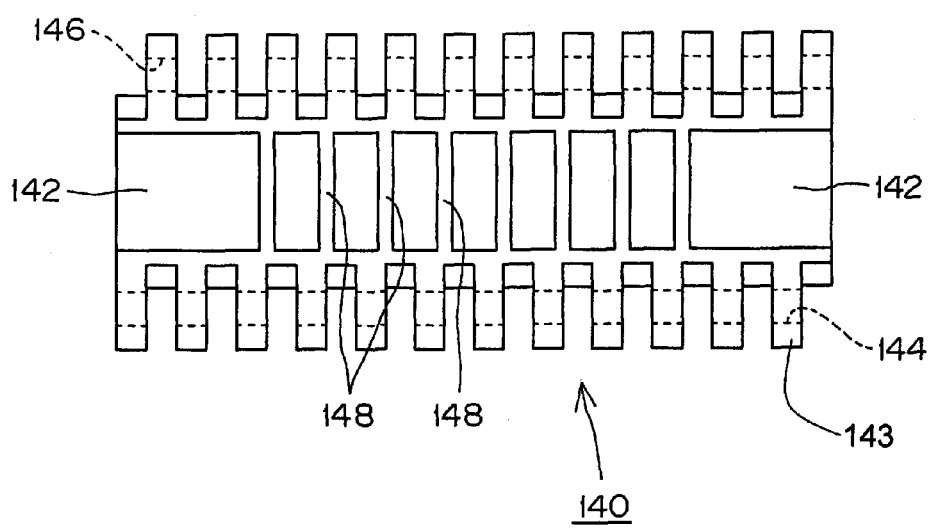
FIG. 4 is an inverted plan view of a center module of the first embodiment.

Concave and convex portions are provided on the respective opposed long outside surfaces of the rectangular modules 120, 140, 150 and 160 transverse to the travel direction of the conveyor chain. As shown in FIGS. 1, 2 and 4, the series of teeth 123 formed on a outside surface of the center module 120 on the front side interdigitate with an identical series of teeth 143 formed on the outside surface on the rear side of an adjacent center module 140, and the series of projecting teeth 123 formed on a side surface on the rear side of the module 120 interdigitate with the series of projecting teeth 143 formed on a side surface on the front side of an adjacent module 140. The front and rear center modules 120 and 140 are flexibly connected to each other by inserting connecting pins through pin holes 124 and 126 provided in the series of projecting teeth 123 in a pierced manner, and the pin holes 144 and 146 in the series of teeth 143. Further, the spiral drum engagement modules 120 and 140 are formed symmetrically about the center of itself such that when the module is rotated by 180° the same exact shape can be obtained. Therefore the conveyor chain 100 can be assembled without considering the direction of the module.

Further, in the center module 140, reinforcing ribs 148 are formed on only the central portions of the back surface of the center module 140 as shown in FIGS. 1 and 4. And both ends of the center module 140 have non-ribbed portions 142 where ribs are not formed on its back side. As shown in FIG. 1, the non-ribbed portions 142 in the center modules 140 are aligned with the traveling guide sockets 122 of the spiral drum engagement modules 120 and are arranged on every other row of the module rows and along the rotary axes of the spiral drums 180 and 190, so that flight portions 180a and 190a do not interfere with ribs of the center module 140 existing between the spiral drum engagement modules 120 and 120. It is noted that the outer shape of the center module 140 is the same shape as the spiral drum engagement module 120 and the center module 140 is formed symmetrically about the center of itself. Therefore, the conveyor chain 100 can be formed without considering the direction of the module as in the spiral drum engagement module 120.

Figure 5:
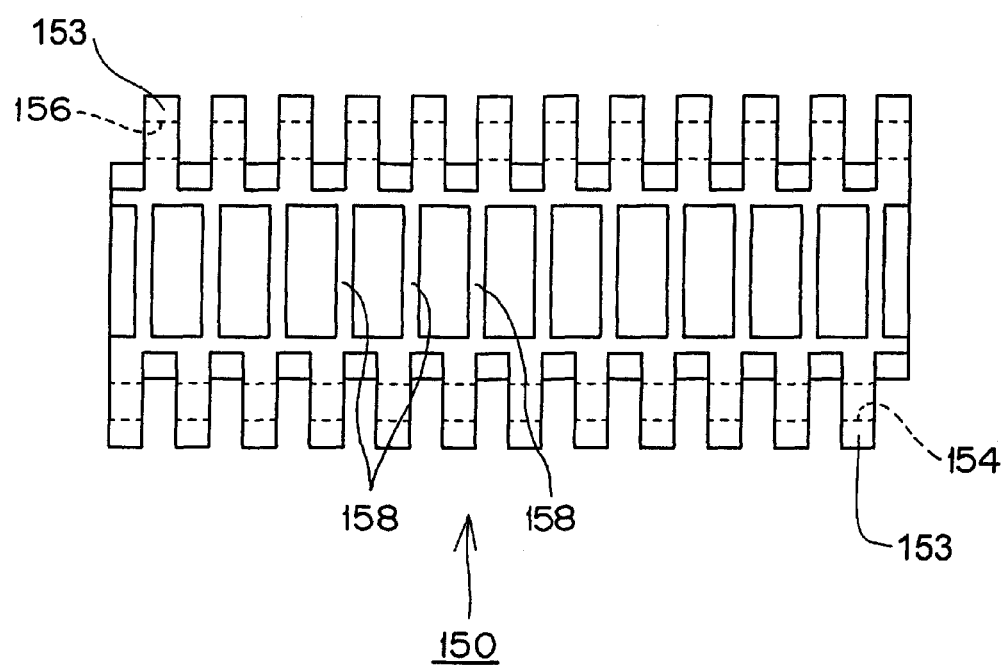
FIG. 5 is an inverted plan view of a full size end module of the first embodiment.

Further, as shown in FIG. 5, although the full size end module 150 has the same outer shape as the center module 140, it has no non-ribbed portion 142 (unlike the center module 140), and has reinforcing ribs 158 formed at the same intervals as shown in FIG. 5. It has a series of teeth 153 along the front and rear long sides, and the teeth have pin holes 154 and 156 to receive connecting pins (not shown). Further, the half size end modules 160 (shown in FIG. 1, but not separately illustrated) each have a half length of the full size end module 150, and are alternately arranged size end portions with respect to the full size end modules 150 on both ends of the conveyor chain 100. Further, half size end module 160 is formed such that the outer shape of the half size end module 160 is symmetrical about the center of itself. Therefore, a differentiation between members provided on the left side and the right side of the conveyor chain 100 is not required and reduction in the number of parts and reduction in an assembly work load are realized. It is noted that since the full size end module 150 and the center module 140 have the same shape except for the presence and absence of the non-ribbed portion 142 as described above, the center module 140 can be used in place of the full size end module 150 if there is capacity in strength. As a result the number of parts can be further reduced.

A conveyor chain conveying device of the present embodiment has the conveyor chain 100 as a conveying medium in which a module row A in which a full size end module 150, a spiral drum engagement module 120, a center module 140, a spiral drum engagement module 120 and a full size end module 150 are connected in the width direction of the conveyor chain 100 and a module row B in which two half size end modules 160 arranged on both ends of the row of the conveyor chain 100 and four center modules 140 are connected in the width direction of the conveyor chain 100, are alternately connected to each other in a longitudinal direction of the conveyor chain 100, as shown in FIG. 1. Preferably the conveyor chain 100 is assembled as an endless loop having an exposed conveying surface through the transfer passage.

Since this conveyor chain 100 has a configuration as described above, it has a width of five times of the length of the spiral drum engagement module 120 and is provided with a module having two spiral drum engagement modules 120 in alternate rows A, and two modules 140 in the intermediate rows B. As the result traveling guide sockets 122 are arranged in parallel with each other so that they sandwich the center line of the travel direction of the conveyor chain 100, and every other module row. A pair of spiral drums 180 and 190, which apply thrust to the conveyor chain 100 are arranged in straight paths under the chain in the transfer passage aligned with the traveling guide sockets 122 on the back surface side of the conveyor chain 100. These spiral drums 180 and 190 each have a spiral pitch of a half pitch of the traveling guide socket 122. Therefore, two rotations of the spiral drums 180 and 190 advance the conveyor chain 100 by a pitch of the traveling guide socket 122 that is a width of two modules.

The spiral drum 180 is a right wound drum. The spiral drum 190 is a left wound drum. Since in the traveling guide socket 122 provided in the spiral drum engagement module 120, an open surface is a rectangle whose short sides 122a are parallel to a travel direction of the chain and the central points of a pair of long sides 122b of the rectangle has points 122f which are symmetrical about the center of the module, as shown in FIG. 2, the traveling guide socket 122 can be similarly engaged with a right wound spiral drum 180 and a left wound spiral drum 190 as shown in FIG. 1. Therefore the traveling guide socket 122 can be used irrespective of a winding direction and a rotational direction. Further, in the conveyor chain driving device of the first embodiment when a right winding spiral drum 180 is right rotated, an action which biases the conveyor chain 100 in a right direction with respect to the advance direction, is generated, and, when a left winding spiral drum 190 is left rotated, an action which biases the conveyor chain 100 in a left direction with respect to the advance direction, is generated. However, by making the winding directions and the rotational directions of a pair of spiral drums 180 and 190 opposed directions to each other, the above-described biasing actions are canceled by each other. As a result the conveyor chain 100 smoothly travels without being biased sideways in a state where it is tensioned in the right and left directions with respect to the advance direction, that is a state where lateral displacement of the transfer surface of the chain is not generated.

The Second Embodiment

The second embodiment, which is another embodiment of a conveyor chain and a conveyor chain driving device according to the present invention, will be described with reference to FIGS. 6 to 11. It is noted that to clearly show the boundaries of the respective conveying modules the description of ribs formed on the back side of each conveying module in parallel with the travel direction of the chain is omitted and only traveling guide sockets 222, which are described later, are shown by dotted lines in FIG. 6.

Since the conveyor chain and the conveyor chain driving device of the second embodiment of the present invention have the same configurations and functions of the basic device as the above-described conveyor chain and the conveyor chain driving device of the first embodiment of the present invention, a detailed explanation of the identical parts in the second embodiment is rendered unnecessary by changing the reference numerals 100-190a of the corresponding members to reference numerals 200-290a.

Figure 6:
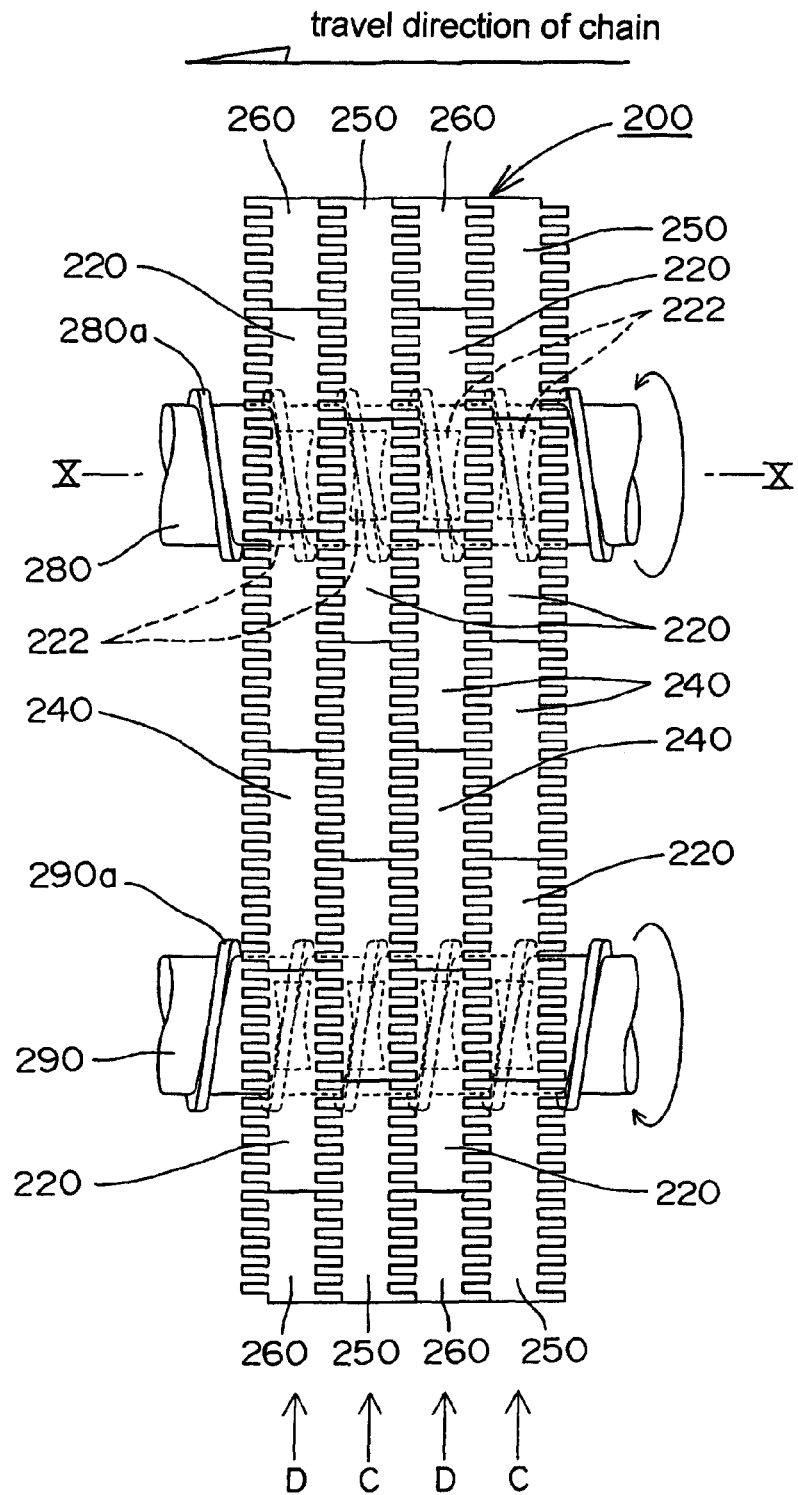
FIG. 6 is a simplified top plan view of a conveyor chain and a conveyor chain driving device of a second embodiment of the invention.
Figure 7:
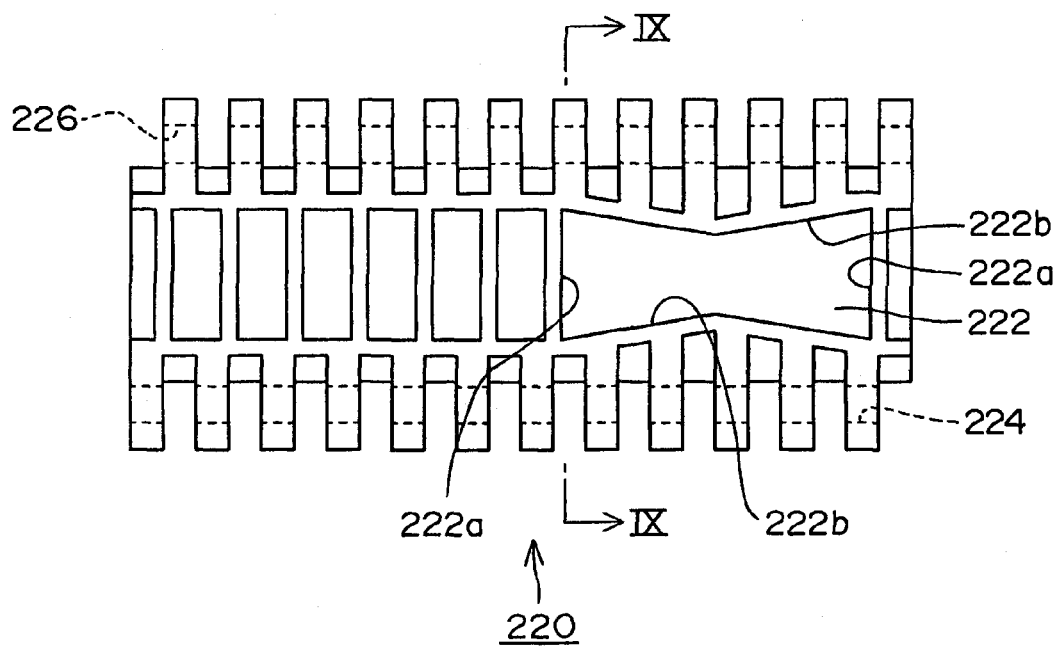
FIG. 7 is a plan view of a spiral drum engagement module of the second embodiment viewed from the back side.
Figure 8:
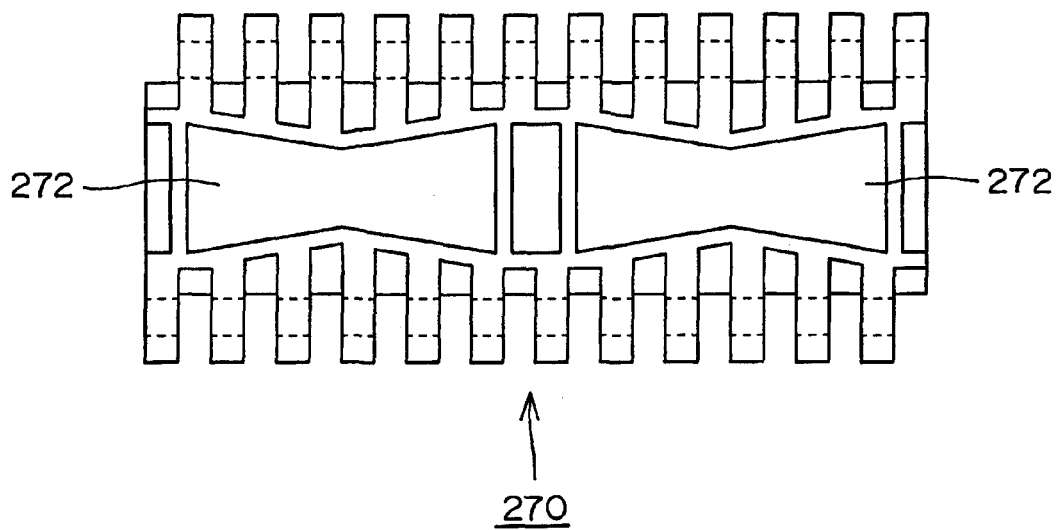
FIG. 8 is a plan view of a modified spiral drum engagement module viewed from the back side.

In the conveyor chain 200 of the second embodiment, a traveling guide socket 222 provided in a spiral drum engagement module 220 is provided not at the center of the module but near one side of the module, as shown in FIG. 7. As shown in FIG. 6, the spiral drum engagement module 220 is reversed by 180° in its orientation in each successive every module row so that a traveling guide socket 222 is aligned in a straight line to form it in a brick pattern whereby the spiral drum engagement module 220 is arranged every module row. With reference to FIG. 6, the alternate module rows (labeled C) having full sized end modules 250 have the modules 220 reversed by 180° relative to modules 220 in the intermediate rows (labeled D) having half-sized end modules 260. It is noted that as an alternative shown in FIG. 8, provision of traveling guide sockets 272 on the right and left sides in the spiral drum engagement module 270 allows a formation of a conveyor chain without reversing the orientation of the spiral drum engagement module 270 every module row whereby an assembly work load can be reduced.

Thus, as shown in FIG. 6, a module row C in which a full size end module 250, a spiral drum engagement module 220, a center module 240, a spiral drum engagement module 220 and a full size end module 250 are connected in the width direction of the conveyor chain 200 and a module row D in which a half size end module 260, a spiral drum engagement module 220, two center modules 240, a spiral drum engagement module 220 and a half size end module 250 are connected in the width direction of the conveyor chain 200 alternate with each other in the longitudinal direction of the conveyor chain 200 to form the conveyor chain 200 as a transfer medium. Thus the endless conveyor chain 200 forms a transfer passage. It is noted that since in the center module 240, provision of a non-ribbed portion is not needed unlike the center module 140 in the first embodiment and the center module 240 can be made to be the same shape as the full size end module 140, the number of parts can be reduced.

The conveyor chain 200 illustrated in FIG. 6 has a configuration as described above. It has a width of five times of the length of the spiral drum engagement module 220 and is provided with two spiral drum engagement modules 220 every the module row. As the result two traveling guide sockets 222 are arranged in parallel with each other so that they sandwich both the center line of the travel direction of the conveyor chain 200, and the center of every row of the modules. A pair of spiral drums 280 and 290, which apply thrust to the conveyor chain 200 are arranged at a part of the straight path under the transfer passage along the traveling guide sockets 222 which are aligned on the back surface side of the conveyor chain 200. The spiral drums 280 and 290 each have the same spiral pitch as a pitch of the traveling guide socket 222. Therefore, one rotation of the spiral drums 280 and 290 advances the conveyor chain 200 by a pitch of the traveling guide socket 222 that is a width of one module.

Figure 9:
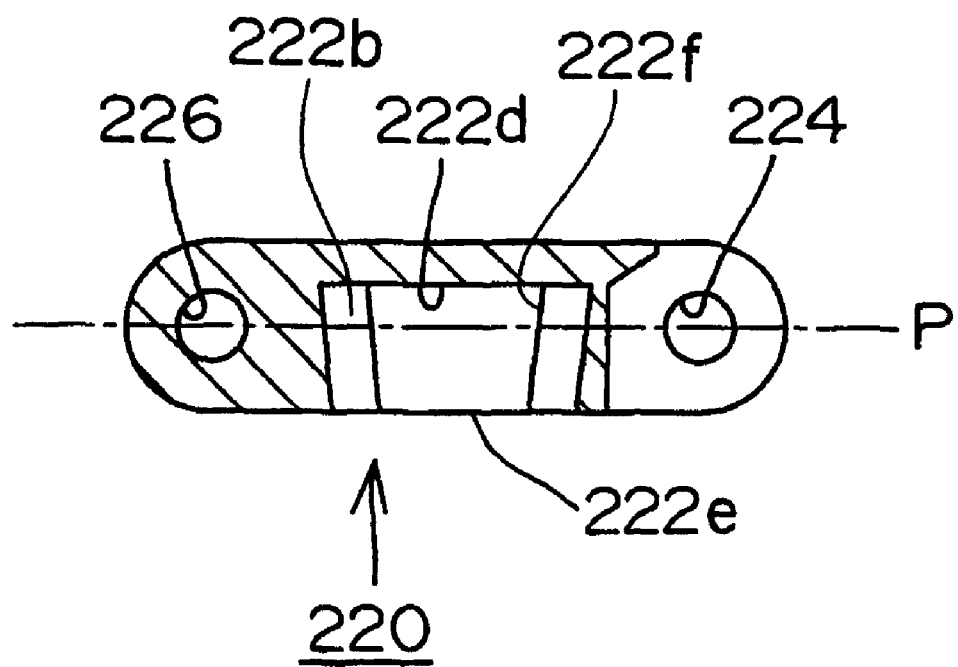
FIG. 9 is a cross-sectional view taken along the line IX-IX of FIG. 7.
Figure 10:
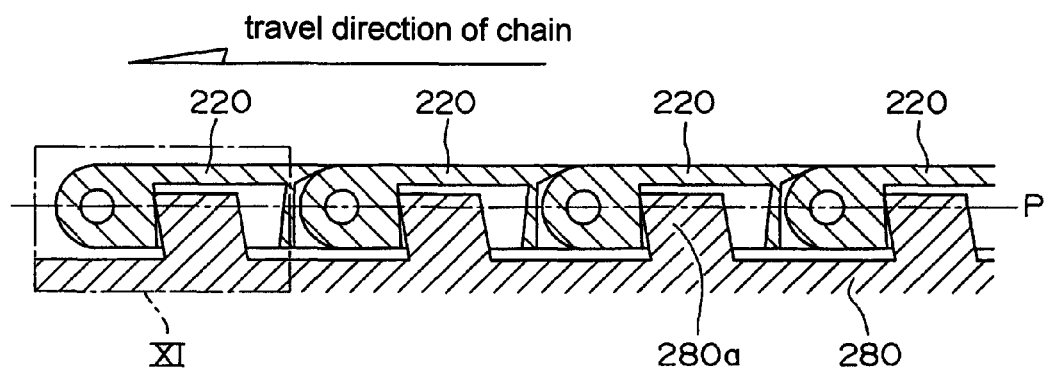
FIG. 10 is a cross-sectional view taken along the line X-X of FIG. 6.
Figure 11:
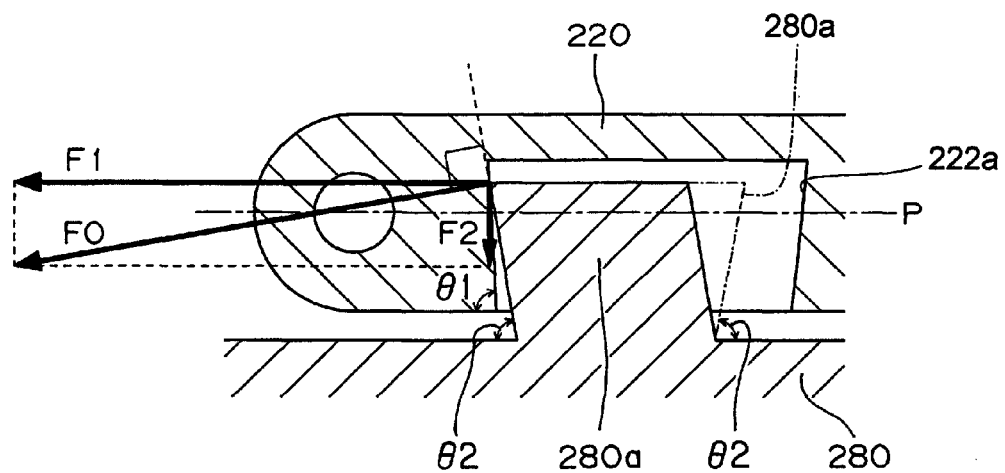
FIG. 11 is an enlarged view of the portion enclosed in the box XI in FIG. 10.

As shown in FIG. 9, the traveling guide socket 222 provided in the spiral drum engagement module 220 has a tapered wall 222b which produces a reversed tapered shape in a vertical cross-sectional shape along the travel direction of the chain in which the width is widened from the socket opening 222e on the back surface, toward a socket bottom surface 222d side. The socket bottom surface 222d is formed such that it is positioned to the conveying surface side of the pitch line P of the conveyor chain which passes through the pin holes 224 and 226. As shown in FIG. 10, the flight portion 280a of the spiral drum 280 has an axial cross-sectional shape inclined in the travel direction of the chain, and as shown in FIG. 11, the flight portion 280a of the spiral drum 280 is formed such that an inclination angle θ2 of the flight portion 280a has a more acute angle than a tapered angle θ1 of the wall 222b of traveling guide socket 222. Such shapes of the thus formed traveling guide socket 222 and the flight portions 280a and 290a of the spiral drums 280 and 290 bring a side surface 222b of the traveling guide socket 222 into contact with side surfaces of the flight portions 280a and 290a of the spiral drums 280 and 290 on a conveying surface side with respect to the pitch line P of the conveyor chain. Therefore, on the contact portion is acted force F0 directed in a slightly lower direction than a horizontal direction. This force F0 can be split to force F1 in a horizontal direction and force F2 in a vertical downward direction. And the force F1 acts as chain driving force, which thrusts the conveyor chain and the force F2 acts as force, which prevents rising up and dislodgement of the chain.

It is noted according to the second embodiment, an axial cross-sectional shape of a flight portion 280a of the spiral drum 280 may be formed to be not only a shape inclined in the chain travel direction by an inclination angle θ2 but also a shape inclined in the opposed direction to the chain travel direction by the same inclination angle θ2 as shown in broken lines at 280b in FIG. 11 that is a shape in which the width of the head of the flight portion is larger than the width of the bottom thereof, whereby the spiral drum may be reversely rotated so that the travel direction of the conveyor chain can be reversed to cause the flight surface 280b to engage the opposite long side 222a of the socket.

The Third Embodiment

Figure 12:
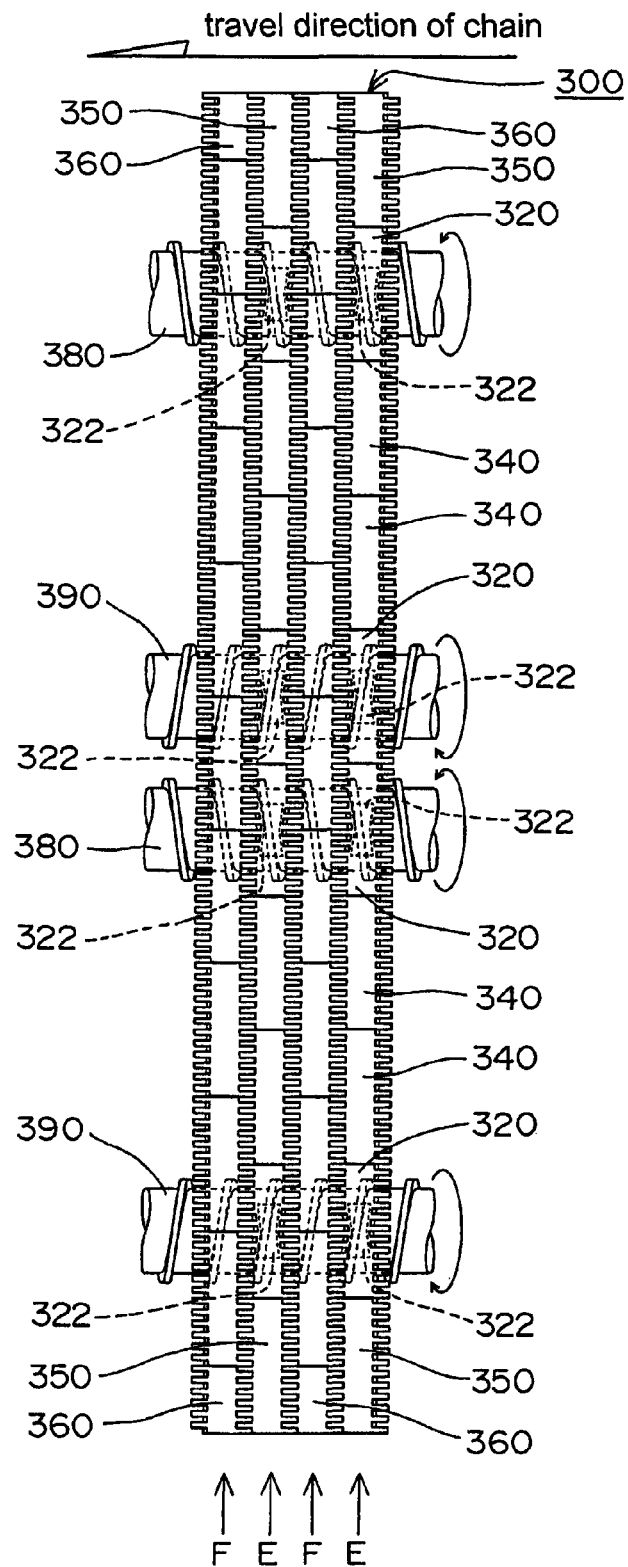
FIG. 12 is a simplified top plan view of a conveyor chain and a conveyor chain driving device of the third embodiment.

The third embodiment, which is another embodiment of a conveyor chain and a conveyor chain driving device according to the present invention, will be described with reference to FIG. 12. FIG. 12 is a top plan view showing an outer appearance of a part of a conveyor chain 300 and a conveyor chain driving device according to the third embodiment viewed from a conveying surface side. It is noted that to clearly show the boundaries of the respective conveying modules the description of ribs formed on the back side of each conveying module in parallel with the travel direction of the chain is omitted and only traveling guide sockets 322 is shown by dotted lines in FIG. 12.

Since the conveyor chain and the conveyor chain driving device of the third embodiment of the present invention has the same configurations and functions of the basic device as the above-described conveyor chain and the conveyor chain driving device of the first embodiment of the present invention except that the width of the conveyor chain and the number of the spiral drums of the first embodiment of the above-described present invention were changed to twice, the explanation of the third embodiment is omitted by changing the reference numerals 100-190 as denoted to the corresponding members to reference numerals 300-390.

In the conveyor chain 300 of the present invention, as shown in FIG. 12, a module row E in which the total of 10 conveying modules, i.e. in sequence one full size end module 350, one spiral drum engagement module 320, two center modules 340, two spiral drum engagement modules 320, two center modules 340, one spiral drum engagement module 320, and one full size end module 350 are all connected in the width direction of the conveyor chain 300 and a module row F in which the total of 11 conveying modules i.e. in sequence one half size end module 360, 9 center modules 240, and one half size end module 360 are all connected in the width direction of the conveyor chain 300. Rows E and F are alternately connected to each other in the longitudinal direction of the conveyor chain 300. The endless conveyor chain 300 forms a transfer passage.

As described above, in the conveyor chain and the conveyor chain driving device according to the present invention, a width and a length can be freely changed by changing the number of the connected conveying modules and at the same time the number of the spiral drums, which apply driving force to the conveyor chain, can be changed by changing the arrangement of the spiral drum engagement modules. Thus according to the present invention, the width of the conveyor chain and the driving force can be flexibly adapted in accordance with required driving force and a size of the article to be conveyed.

Additionally, the conveyor chain and the conveyor chain driving device of the present invention transmit driving force to the conveyor chain by engaging flight portions of spiral drums in traveling guide sockets provided in the back surfaces of selected conveying modules. Therefore, when the conveyor chain passes over a spiral drum, the rising up and dislodgment of the conveyor chain can be prevented so that a stable conveyance of articles to be conveyed can be realized.

The invention claimed is:

1. A conveyor chain adapted to be driven in a travel direction to convey articles, comprising a number of interconnected conveying modules having a conveying surface and a back surface, said chain adapted for use with at least one rotary drum having a rotary axis parallel to said travel direction adjacent to the back surfaces of selected modules and a spiral flight portion adapted to engage the back surfaces of the selected modules and advance them along the travel direction, said spiral flight having an axial cross-sectional shape inclined to the travel direction of the chain for advancing said chain along said travel direction, whereby articles to be conveyed on said conveying surfaces of said conveying modules are conveyed in said travel direction, said back surfaces of the selected modules having a guide socket adapted to engage said spiral flight portion, said socket being generally rectangular with long sides, and having a vertical cross-sectional shape along said travel direction, said shape being reversely tapered, being widened from a concave open side of said socket toward a concave bottom surface of said socket, said tapered shape adapted to engage said inclined flight portion of the rotary drum.

2. A conveyor chain according to claim 1, wherein said tapered shape has a taper angle steeper than the angle of inclination of said flight portion, whereby the free end of said flight portion engages said tapered shape and resists dislodgement of said flight portion from said socket.

3. A conveyor chain according to claim 1 including intermediate modules aligned with and interconnected in alternation between said selected modules in said travel direction, said intermediate modules having generally rectangular flight-receiving sockets, said intermediate sockets having straight opposite long sides without a central point.

* * * * *